United States Patent
Gottschlich

(10) Patent No.: US 11,635,949 B2
(45) Date of Patent: Apr. 25, 2023

(54) METHODS, SYSTEMS, ARTICLES OF MANUFACTURE AND APPARATUS TO IDENTIFY CODE SEMANTICS

(71) Applicant: Intel Corporation, Santa Clara, CA (US)

(72) Inventor: Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/555,051

(22) Filed: Dec. 17, 2021

(65) Prior Publication Data
US 2022/0107792 A1    Apr. 7, 2022

(51) Int. Cl.
| | |
|---|---|
| *G06F 9/44* | (2018.01) |
| *G06F 8/41* | (2018.01) |
| *G06F 8/75* | (2018.01) |
| *G06F 8/74* | (2018.01) |
| *G06N 5/04* | (2023.01) |

(Continued)

(52) U.S. Cl.
CPC .............. *G06F 8/436* (2013.01); *G06F 8/447* (2013.01); *G06F 8/74* (2013.01); *G06F 8/75* (2013.01); *G06F 11/3608* (2013.01); *G06F 18/2132* (2023.01); *G06N 5/04* (2013.01)

(58) Field of Classification Search
None
See application file for complete search history.

(56) References Cited

U.S. PATENT DOCUMENTS

| | | | |
|---|---|---|---|
| 8,306,784 B2* | 11/2012 | Albers | G06F 11/3608 |
| | | | 702/182 |
| 9,571,350 B2* | 2/2017 | Kamble | H04L 47/2425 |

(Continued)

OTHER PUBLICATIONS

Gottschlich et al., "The Three Pillars of Machine Programming," arXiv.1803.07244 [cs.AI], [https://doi.org/10.48550/arXiv.1803.07244], May 8, 2018, 11 pages.

(Continued)

*Primary Examiner* — Qamrun Nahar
(74) *Attorney, Agent, or Firm* — Hanley, Flight & Zimmerman, LLC

(57) ABSTRACT

Methods, apparatus, systems, and articles of manufacture are disclosed to identify code semantics. An example apparatus includes processor circuitry to perform at least one of first, second, or third operations to instantiate validated repository parse circuitry to identify embedding values corresponding to validated code, syntax analysis circuitry to identify syntax information based on statistical recurrence metrics of the embedding values, bidirectional model circuitry to train a forward semantic model and a backward semantic model based on (a) semantic information corresponding to the syntax information and (b) divisional segmentation information corresponding to the syntax information, and target repository mining circuitry to generate target code model input fragments including learned syntactic information, learned semantic information, and learned divisional segmentation information, the target code model input fragments to facilitate inference with the forward semantic model and the backward semantic model.

24 Claims, 11 Drawing Sheets

(51) Int. Cl.
*G06F 11/36* (2006.01)
*G06F 18/2132* (2023.01)

(56) References Cited

U.S. PATENT DOCUMENTS

2009/0112943 A1\* 4/2009 Suzuki .................. G06F 16/93
2016/0335170 A1\* 11/2016 Yakuwa ................. G06F 11/36
2017/0185585 A1\* 6/2017 Applegate ............. G06N 3/088
2022/0171932 A1\* 6/2022 Parthasarathy ......... G06N 3/02

OTHER PUBLICATIONS

Ye et al.,"MISIM: A Neural Code Semantics Similarity System Using the Context-Aware Semantics Structure," arXiv:2006.05265V6 [cs.LG], [https://doi.org/10.48550/arXiv.2006.05265], Jun. 2, 2021, 22 pages.

Iyer et al., "Software Language Comprehension using a Program-Derived Semantics Graph," 34th Conference on Neural Information Processing Systems (NeurIPS 2020), Dec. 11, 2020, 13 pages.

Alon et al., "code2vec: Learning Distributed Representations of Code," arXiv:1803.09473 [cs.LG], [https://doi.org/10.48550/arXiv.1803.09473], Oct. 30, 2018, 30 pages.

Luan et al., "2019. Aroma: Code Recommendation via Structural Code Search," Proc. ACM Program. Lang. 3, OOPSLA, Article 152, Oct. 17, 2019, 28 pages.

Ben-Nun et al., "Neural Code Comprehension: A Learnable Representation of Code Semantics," 32nd Conference on Neural Information Processing Systems (NeurIPS 2018), Nov. 29, 2018, 17 pages.

Vaswani et al., "Attention Is All You Need," 31st Conference on Neural Information Processing Systems (NIPS 2017), Dec.6, 2017, 15 pages.

Hasabnis et al., "ControlFlag: A Self-Supervised Idiosyncratic Pattern Detection System for Software Control Structures", Proceedings of the 5th ACM SIGPLAN Inter-national Symposium on Machine Programming (MAPS '21), May 17, 2021, 11 pages.

Alam et al., "A Zero-Positive Learning Approach for Diagnosing Software Performance Regressions," 33rd Conference an Neural Information Processing Systems (NeurIPS 2019), Jan. 1, 2020, 13 pages.

\* cited by examiner

METHODS, SYSTEMS, ARTICLES OF MANUFACTURE AND APPARATUS TO IDENTIFY CODE SEMANTICS

FIELD OF THE DISCLOSURE

This disclosure relates generally to code analysis and, more particularly, to methods, systems, articles of manufacture and apparatus to identify code semantics.

BACKGROUND

In recent years, code developers (e.g., human programmers, programmers, software development personnel, automated code analyzers, etc.) have been inundated with many different programming languages, algorithms, data types and/or programming objectives/tasks. Such code developers also have a vast quantity of selections for analysis tools and/or integrated development environments (IDEs), such as Microsoft Visual Studio®, Eclipse®, etc. The various IDEs provide code developers with development environments having tools to assist in writing code and code syntax checking.

BRIEF DESCRIPTION OF THE DRAWINGS

In general, the same reference numbers will be used throughout the drawing(s) and accompanying written description to refer to the same or like parts. The figures are not to scale.

Figure 1:
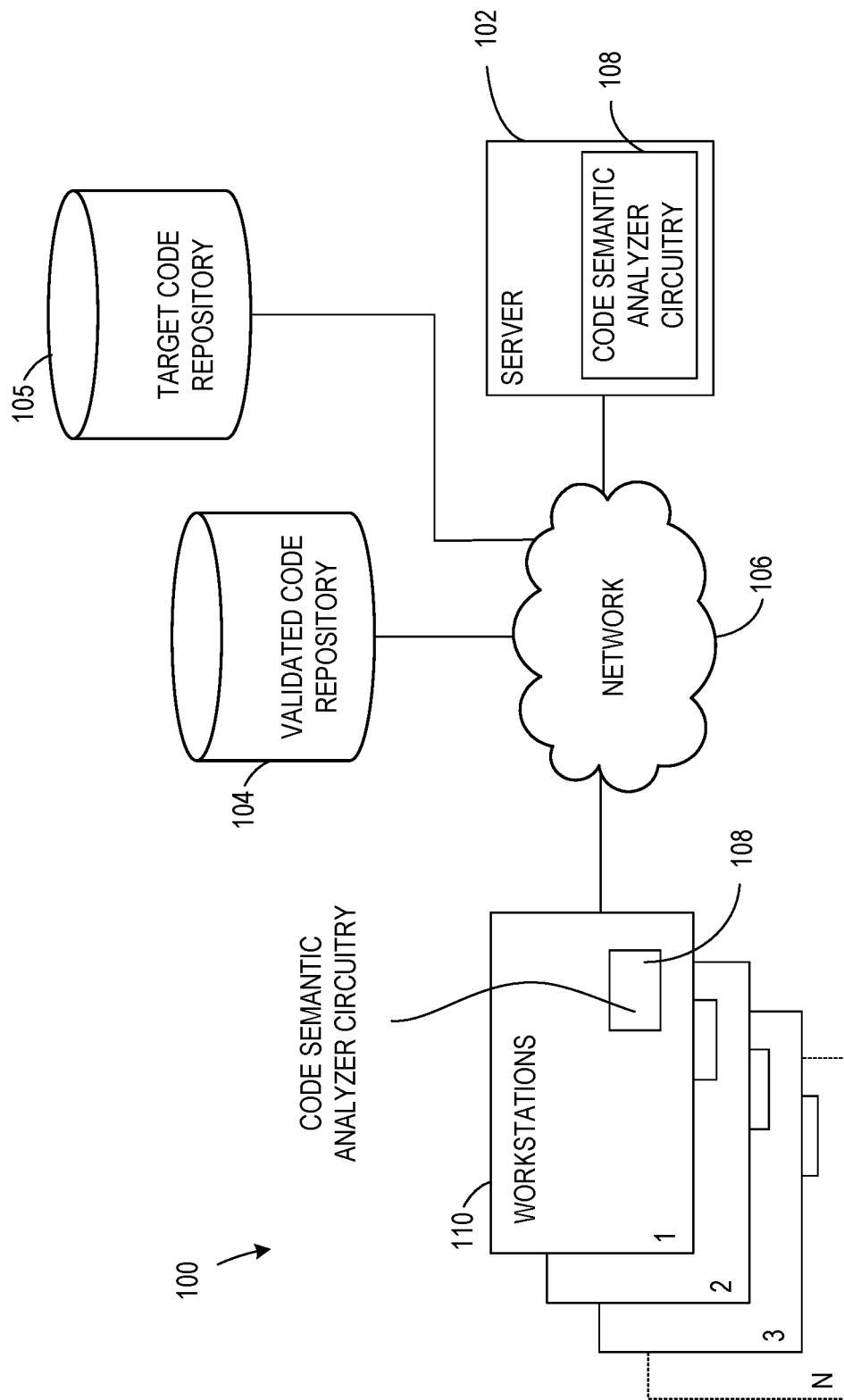
FIG. 1 is a schematic illustration of an example system to identify and analyze code semantics constructed in a manner consistent with teachings of this disclosure.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Machine programming (MP) includes a focus on, in part, automation of software. However, in an effort to facilitate helpful machine learning (ML) resources to automate software, improvements in code reasoning (a subfield of MP) are needed. Examples disclosed herein facilitate improved code reasoning for target code under analysis and employ deep neural networks, including long short-term memories (LSTMs). Examples disclosed herein analyze code in a bidirectional manner, and in a manner that considers logical code fragment divisions, as described in further detail below. Additionally, unlike prior techniques and/or systems that limit analysis to abstract syntax trees, examples disclosed herein develop programming language constructs learned through self-supervised techniques, as described in further detail below.

Artificial intelligence (AI), including machine learning (ML), deep learning (DL), and/or other artificial machinedriven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In non-limiting examples disclosed herein, a reinforcement model (reinforcement learning) is used. Using a reinforcement model enables arbitrary behaviors/observations to play-out scenarios such that an agent can identify how to act/perform in an effort to maximize a reward (or minimize a punishment). As used herein, an agent is a representation of the influence of making a change, such as a code function that, when executed, causes activity and a change in state. In some examples disclosed herein, an agent is referred-to as a sub-agent. While the aforementioned example refers to reinforcement models, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. In other examples, unsupervised training is facilitated. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs). Generally speaking, supervised learning/training is particularly useful when predicting values based on labeled data, and unsupervised training/learning (e.g., used in deep learning, a subset of machine learning, etc.) involves inferring patterns from inputs to select parameters for the ML/AI model (e.g., without the benefit of expected (e.g., labeled) outputs). Stated differently, unsupervised learning is particularly useful when attempting to identify relationships in unlabeled data.

While some examples disclosed herein train ML/AI models in a manner consistent with reinforcement learning, any other training algorithm may additionally or alternatively be used. In examples disclosed herein, training is performed until convergence, which is aided through the use of neural networks. Training is performed using hyperparameters that control how the learning is performed (e.g., a learning rate, a number of layers to be used in the machine learning model, etc.). In examples disclosed herein, hyperparameters that control a discount factor enable varying degrees of learning experimentation and attempts to "try.". Such hyperparameters are selected by, for example, empirical observation, time constraints, etc. In some examples re-training may be performed.

In some examples, training is performed using training data. In examples disclosed herein, the training data originates from a code corpus of code samples deemed to particularly useful and error free (e.g., industry standard code that has been "vetted."). Because supervised training is used, the training data is labeled.

In some examples, once training is complete, the model is deployed for use as an executable construct that processes an input and provides an output based on the network of nodes and connections defined in the model. The model is stored at storage devices (e.g., memory, databases, etc.) and/or network-accessible storage device (e.g., cloud-based storage services/hardware).

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Prior code analysis techniques approach target code of interest in a unidirectional manner. This means that such techniques process code as a sequence of instructions from some predetermined starting point to some predetermined ending point. As such, these traditional techniques require code semantic similarity analysis to find only those code fragments that begin in the same way. However, code that begins in the same way is not necessarily required to reveal code semantics equivalence. Instead, examples disclosed herein analyze target code of interest in a bidirectional manner to overcome limitations associated with traditional approaches.

To illustrate limitations of analysis systems having only a forward sequence approach to analysis, consider text prediction techniques, such as those typically utilized by mobile phones. In the event a user attempts to type "t" in an effort to spell out the word "the," but inadvertently misses the letter "t" and instead selects "f", then subsequent word suggestions all begin with the letter "f." For instance, if the user continues the erroneous typing pattern "fhe," then corresponding suggestions appear that are completely unrelated to the desired word (e.g., "fheta" may be suggested instead of "the"). However, in the event the text prediction technique were to also conduct a backwards analysis of the misspelled word "fhe," then additional suggestions can be considered for words ending in "he," such as the intended word "the." While the above illustration is simplistic, it is an analogous description of examples disclosed herein to improve code semantics analysis.

In another example consider the following code sample of Listing 1 below:

Listing 1

```
switch (data_type)
{
    case kAnomalyDataType:
        return var.generate_anomaly_value(event);
        break;
    case kNormalDataType:
        return var.generate_normal_value(event);
        break;
    default:
        throw std::string("unknown data_type for generate_data_entry");
}
```

In the above example of Listing 1, the code sample contains a basic switch statement (e.g., a switch programming language token), which is a native programming language construct in C/C++ with three (3) cases. In this particular example, there are no ordering results for the cases, thus swapping the order of the first case (kAnomalyDataType) with the second case (kNormalDataType) is syntactically legal and semantically equivalent. Similarly, the default case could be moved to anywhere within the example switch clause of Listing 1 without causing any syntax error. However, further consider the following code sample of Listing 2 below:

Listing 2

```
if (data_type == kNormalDataType)
    return var.generate_normal_value(event);
else if (data_type == kAnomalyDataType)
    return var.generate_anomaly_value(event);
else
    throw std::string("unknown data_type for generate_data_entry");
```

In the above example of Listing 2, the switch has been rewritten entirely using if/else if/else without any change in the semantics of the code. Despite such substantial differences in code syntax, examples disclosed herein employ divisional and bidirectional analysis to identify semantic similarity. Examples disclosed herein are capable of analyzing any type of programming language embeddings, constructs, tokens, operands, etc.

FIG. 1 is a schematic illustration of an example system to identify and analyze code semantics 100. In the illustrated example of FIG. 1, the system 100 includes an example server 102 communicatively connected to an example validated code repository 104 and an example target code repository 105 via an example network 106. The example server 102 includes example code semantic analyzer circuitry 108 to identify code semantics, as described in further detail below. The example code semantic analyzer circuitry 108 is communicatively connected to any number of example workstations 110 via the example network 106. In some examples, respective workstations 110 communicatively connect to the example code semantic analyzer circuitry 108 during code drafting and/or debugging efforts, in which the example code semantic analyzer circuitry 108 may render a graphical user interface (GUI) and/or terminal screen for data input/output. However, in some examples the code semantic analyzer circuitry 108 may be located with each respective workstation 110 in a self-contained manner without the aid or need of the example server 102. Additionally, while the illustrated example of FIG. 1 illustrates the example validated code repository 104 and the example target code repository 105 as separate entities communicatively connected via the example network 106, in some examples the databases reside within the example server 102 and/or within each respective workstation 110 (e.g., in the example code semantic analyzer circuitry 108 of each respective workstation 110).

Figure 2A:
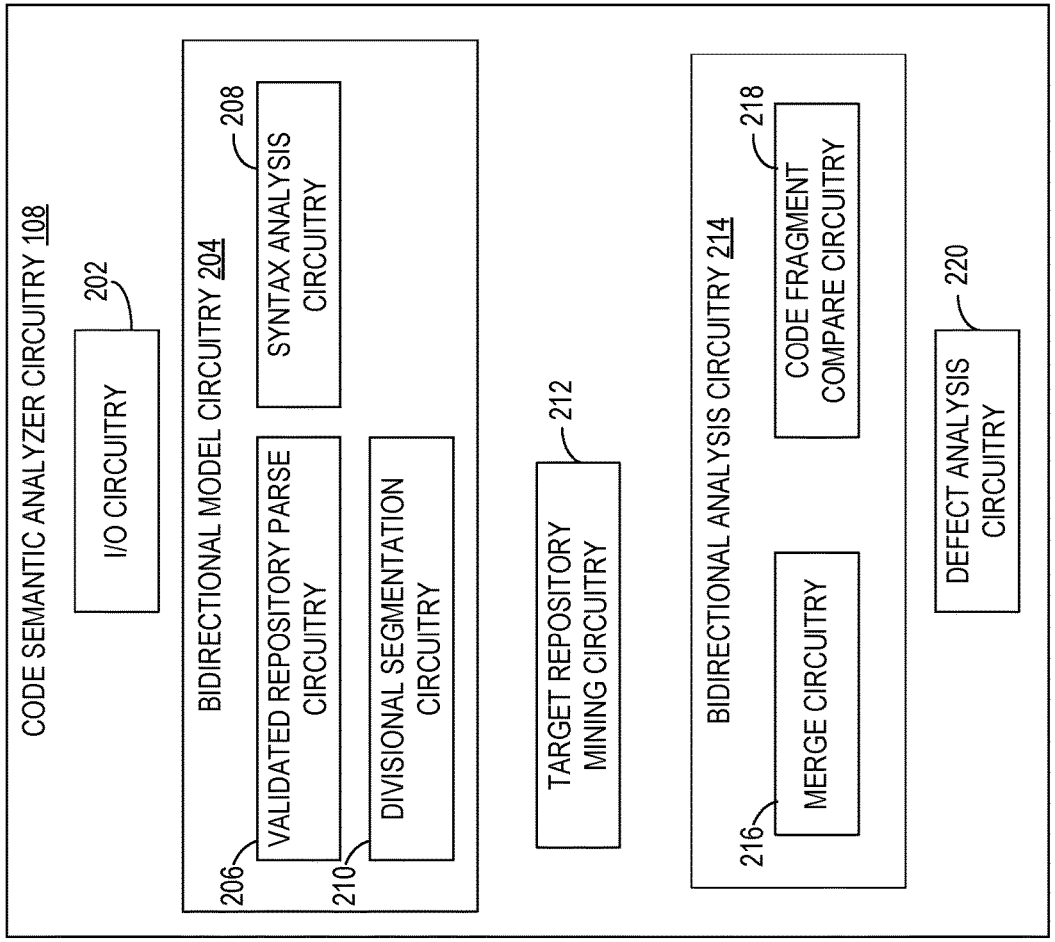
FIG. 2A is a schematic illustration of code semantic analyzer circuitry of FIG. 1 to identify and analyze code semantics.

FIG. 2A illustrates additional detail corresponding to the example code semantic analyzer circuitry 108 of FIG. 1. In the illustrated example of FIG. 2A, the code semantic analyzer circuitry 108 includes example input/output (I/O) circuitry 202, and example bidirectional model circuitry 204, which includes validated repository parse circuitry 206, syntax analysis circuitry 208 and divisional segmentation circuitry 210. The example code semantic analyzer circuitry 108 also includes example target repository mining circuitry 212, example defect analysis circuitry 220, and example bidirectional analysis circuitry 214, which includes example merge circuitry 216 and example code fragment compare circuitry 218.

In operation, the example I/O circuitry 202 selects a programming language of interest. In some examples, the programming language of interest is based on a selected validated code repository or a target code repository that is to be analyzed, in which particular code and/or code fragments therein are written in a particular programming language. In particular, the learning of embedding values for programming language constructs is programming language-specific. As used herein, embedding values are particular programming language instructions and/or symbols. As used herein, programming language constructs are one or more embedding values (syntax) that, when written in a particular programming language, produce and/or otherwise cause a programmatic result. Examples disclosed herein mine and/or otherwise parse code repositories (e.g., user-specified repositories, curated code reasoning repositories (e.g., IBM's CodeNet, Google's Code Jam, POJ-104, etc.) in an effort to learn the programming language keywords and semantics. Example systems to mine and/or otherwise parse code corpus databases include the Machine Inferred Code Similarity (MISIM) system, which determines semantics from code syntax and applies neural code similarity scoring algorithms with learned parameters.

The example bidirectional model building circuitry 204 learns embeddings and syntax associated with a selected programming language or a selected validated code repository 104. In some examples, the bidirectional model building circuitry 204 invokes the example I/O circuitry 202 to select a validated code repository, such as CodeNet, CodeJam, etc. Generally speaking, before target code of interest is analyzed (e.g., to identify code semantics, bug detection, etc.), examples disclosed herein analyze known good and/or otherwise error free code in an effort to train bidirectional models for syntax detection, semantics detection, and divisional segmentation boundary detection.

The example validated repository parse circuitry 206 parses the validated code repository 104 to identify embedding values. For example, the example validated repository parse circuitry 206 identifies embedding values such as, but not limited to, "for" statements, "if" statements, "switch" statements, etc. As described above, an embedding value 'for' is indicative of the programming construct associated with a for-loop in C or C++. As described above, the validated repository parse circuitry 206 may utilize ML-guided parsing and/or the MISIM system to learn programming language keywords and semantics. The example syntax analysis circuitry 208 generates statistical recurrence metrics for embedding values (e.g., language keywords and constructs) to identify syntax frameworks corresponding to the programming language of the selected validated code repository 104. Over a large enough corpus of data (e.g., validated code data 104), language keywords and constructs will exhibit a greater statistical recurrence than other syntax, thereby resulting in a consensus programming language keyword and construct framework(s). Deep neural network application to such consensus information enables semantic learning of different code structures and well as divisional segmentation boundary information. As such, the example syntax analysis circuitry 208 applies machine learning semantic construct model(s) to learn some semantics corresponding to the syntax framework(s). However, as described above and in further detail below, semantic discovery is improved by examples disclosed herein that apply bidirectional analysis techniques in view of the divisional segmentation boundary information.

The example divisional segmentation circuitry 210 applies machine learning divisional model(s) to learn divisional segmentation boundaries of the programming language constructs. Divisional segmentation information is learned based on self-supervised learning in view of the validated and/or otherwise trusted code repository 104. Divisional segmentation boundaries are generally based on language-specific constructs that are mined as disclosed above. As also described above, based on the statistical recurrence of syntax occurrence for particular programming language constructs, the divisional segmentation circuitry 210 applies any sequence deep neural network to learn semantic meanings and derive/learn divisional segmentation boundaries in the code. In some examples, user input can be added and/or otherwise recommended as divisional segmentation boundaries. For example, a user of the system 100 may provide a rule to the system, such as the rule illustrated in example Listing 3.

---
Listing 3
---
Language: C/C++
Programming language construct: for
Divisional segmentation recommendation:
 1. Single instruction loop: for {*;*;*} *;
 2. Multi-instruction loop: for {*;*;*} {*;}
---

In the illustrated example of Listing 3, the asterisks (*) refers to one or more wildcard strings.

The example bidirectional model circuitry 204 stores the learned programming language constructs and divisional segmentation boundaries in a data source (e.g., a data structure in a memory, in the example validated code repository 104, etc.) for further use during one or more training and inference phases. The example stored learned programming language constructs and divisional segmentation boundaries are referred to herein as vetted code model input, as described in further detail below. In an example training phase, the bidirectional model circuitry 204 generates and trains bidirectional semantic analyzer models in two separate directions. In particular, the bidirectional model circuitry 204 generates and trains (based on the stored learned programming language constructs and divisional segmentation boundaries) a forward model (F) and a backward model (B). The example bidirectional models are trained to learn posfix and prefix deviations for code semantics similarity. This bidirectional approach overcomes limitations exhibited by traditional approaches that speculate only on postfix corrections/analysis, where an initial code structure could be identical, but a subsequent code fragment has one or more minor deviations, thereby preventing proper semantic identification. Conversely, examples disclosed herein that apply a bidirectional modeling analysis can accommodate initial code structure comparisons that are not identical, yet the example system 100 can still assign meaningful semantics similarity metrics and/or designations because of, in part, additional insight afforded by the bidirectional analysis.

At least one objective of example methods, systems, articles of manufacture and apparatus to identify code semantics is to analyze target code of interest. In particular, target code of interest includes code developed by one or more code developers and/or developed by automated systems (e.g., auto machine learning code), which may include one or more code anomalies (e.g., syntax errors, logic errors, etc.). Examples disclosed herein identify source code anomalies using self-supervision machine learning (e.g., aided by statistical significance considerations) in a bidirectional manner and in view of code fragment segmentation boundaries. The example V/O circuitry 202 retrieves target code, such as from the example target code repository 105, and the example target repository mining circuitry 212 generates code fragments based on learned segmentation boundaries. Additionally, the example target repository mining circuitry 212 generates a syntactic representation of the target code (segmented) fragments as well as a semantic representation of the target code (segmented) fragments as input to the forward and backward bidirectional models described above. The syntactic and semantic representations, along with respective segmentation boundary information of the target code, are stored by the example target repository mining circuitry 212 as one or more data structures, referred to herein as target code model input.

In view of the generated vetted code model input and the target code model input, examples disclosed herein perform a bidirectional analysis to allow a comparison of code fragment semantics of the vetted (e.g., known good code) code and the target code of interest. Stated differently, in the event a semantic difference is detected between the vetted code and the target code, then a magnitude of this difference enables an opportunity to further investigate the target code for possible error(s). For instance, semantics difference metrics may include a categorical label between the compared code fragments, such as a "decision" category as compared to a "loop" category. To illustrate, constructs that correspond to the example "decision" category include, but are not limited to, if/then/else constructs and switch constructs. As such, examples disclosed herein identify semantic similarity between if/then/else constructs and switch constructs despite such constructs having different syntax. Alternatively, constructs that correspond to the example loop category include, but are not limited to, for constructs, while constructs, do while constructs, etc. While example semantic comparisons above refer to discrete and/or otherwise binary categorical matching, in some examples, semantic comparisons include threshold metric comparisons. For instance, even if a particular target code fragment exhibits subtle semantic differences from a vetted code fragment, such semantic differences may be represented on a percentage basis, a factor basis (e.g., a similarity metric between zero and one), etc. In some examples, absolute semantic similarity between compared code fragments is not necessary to invoke corrective action and/or further analysis. For instance, a semantic similarity metric of 0.9 may suggest that compared fragments are close to identical (e.g., with a similarity metric of one (1.00) considered absolute parity), which may be a threshold value indicative of semantic similarity, while a semantic similarity metric below a value of 0.89 may suggest and/or otherwise trigger further analysis of the target code for concern that it contains one or more syntax errors.

Briefly turning to the illustrated example of FIG. 2A, an example bidirectional analysis framework 250 is shown. In the illustrated example of FIG. 2A, the framework 250 includes the vetted code model input 252 and the target code model input 254 as inputs to bidirectional models 256. The example bidirectional model circuitry 204 retrieves the vetted code model input 254, which includes learned semantics, programming language constructs and divisional segmentation boundary information corresponding to the vetted code. The example bidirectional model circuitry 204 also retrieves the target code model input 256, which includes stored syntactic representations, semantic representations, and divisional segmentation boundaries corresponding to the target code.

The example bidirectional models 256 include a forward model (F) and a backward model (B), pairs of which accept input from the respective vetted code model input 252 and the target code model input 254. In particular, the example bidirectional analysis circuitry 214 applies, provides and/or otherwise transmits the vetted code model input to the forward neural network model (F) and a backward neural network model (B). Additionally, the example bidirectional analysis circuitry 214 applies, provides and/or otherwise transmits the target code model input to a separate pair of the forward neural network model (F) and a backward neural network model (B).

Output from the example pairs of forward (F) and backward (B) models are transmitted to merging algorithms 258, 260. In particular, the example merging circuitry 216, forwards the vetted code model outputs and the target code model outputs to the respective merging algorithms 258, 260. As described above, unlike traditional semantic analysis systems, examples disclosed herein are not limited to a single forward sequence analysis of possibly defective code against known non-defective code. Rather, examples disclosed herein perform semantic analysis 262 with two sequence passes, one of which compares the two code fragments as a sequence of temporally increasing series of instructions (e.g., tokens or any other temporal representation), and a second of which compares the two code fragments as a sequence of temporally decreasing series of instructions.

The example framework invokes the example code fragment compare circuitry 218 to store pairs of (a) code fragments ($S_i$) corresponding to the known good (vetted) fragments and (b) code fragments ($T_j$) corresponding to the target code (potentially anomalous) that satisfy threshold semantic metrics values (264). As described above, threshold semantic metrics values may include threshold semantic difference values that reflect code fragments having near semantic equivalence, but not absolute semantic parity. For instance, code fragments may be flagged if they exhibit semantic similarity metric values between 0.70 (e.g., the fragments exhibit some similarity, thereby suggesting they intend to perform similar/same objectives, but might include one or more syntax or logical errors) and 0.90 (e.g., the fragments are substantially similar, yet invoking analysis beyond this metric value is likely not expected to reveal substantial syntax, erroneous semantics or logical error(s)). Code fragments that satisfy a threshold of interest are stored in a data storage (e.g., a database) 266 for further analysis.

The example defect analysis circuitry 220 identifies and/or otherwise analyzes the flagged/tagged code fragments for syntax and/or logical analysis. In some examples, compiler system syntax analysis misses one or more syntax errors and/or logical errors that, once flagged by examples disclosed herein, enable an increased degree of scrutiny to be applied to correct such errors/anomalies. In some examples, analysis of the potentially defective code fragments stored in the database 266 are iteratively analyzed, the results of which may be added to an analysis report to enable further defect mitigation.

As described above, FIGS. 1, 2A and 2B are block diagrams of an example code semantics analysis system 100 to do code fragment semantics analysis. The example code semantic analyzer circuitry 108, including the example bidirectional framework 250, of FIGS. 1, 2A and 2B may be instantiated (e.g., creating an instance of, bring into being for any length of time, materialize, implement, etc.) by processor circuitry such as a central processing unit executing instructions. Additionally or alternatively, the example code semantic analyzer circuitry 108 of FIGS. 1, 2A and 2B may be instantiated (e.g., creating an instance of, bring into being for any length of time, materialize, implement, etc.) by an ASIC or an FPGA structured to perform operations corresponding to the instructions. It should be understood that some or all of the circuitry of FIGS. 1, 2A and 2B may, thus, be instantiated at the same or different times. Some or all of the circuitry may be instantiated, for example, in one or more threads executing concurrently on hardware and/or in series on hardware. Moreover, in some examples, some or all of the circuitry of FIGS. 1, 2A and 2B may be implemented by one or more virtual machines and/or containers executing on the microprocessor.

In some examples, the example code semantic analyzer circuitry 108 includes means for input/output, means for bidirectional modeling, means for validated repository parsing, means for syntax analysis, means for divisional segmentation, means for target repository mining, means for bidirectional analysis, means for merging, means for code fragment comparing, and means for defect analyzing. For example, the means for input/output may be implemented by example I/O circuitry 202, the means for bidirectional modeling may be implemented by example bidirectional model circuitry 204, the means for validated repository parsing may be implemented by the example validated repository parse circuitry 206, the means for syntax analysis may be implemented by the example syntax analysis circuitry 208, the means for divisional segmentation may be implemented by the example divisional segmentation circuitry 210, the means for target repository mining may be implemented by the example target repository mining circuitry 212, the means for bidirectional analysis may be implemented by the example bidirectional analysis circuitry 214, the means for merging may be implemented by the example merge circuitry 216, the means for code fragment comparing may be implemented by the example code fragment compare circuitry 218, and the means for defect analyzing may be implemented by the example defect analysis circuitry 220. In some examples, the aforementioned circuitry may be instantiated by processor circuitry such as the example processor circuitry 712 of FIG. 7. For instance, the aforementioned circuitry may be instantiated by the example general purpose processor circuitry 800 of FIG. 8 executing machine executable instructions such as that implemented by at least blocks of FIGS. 3-6. In some examples, the aforementioned circuitry may be instantiated by hardware logic circuitry, which may be implemented by an ASIC or the FPGA circuitry 900 of FIG. 9 structured to perform operations corresponding to the machine readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 2B:
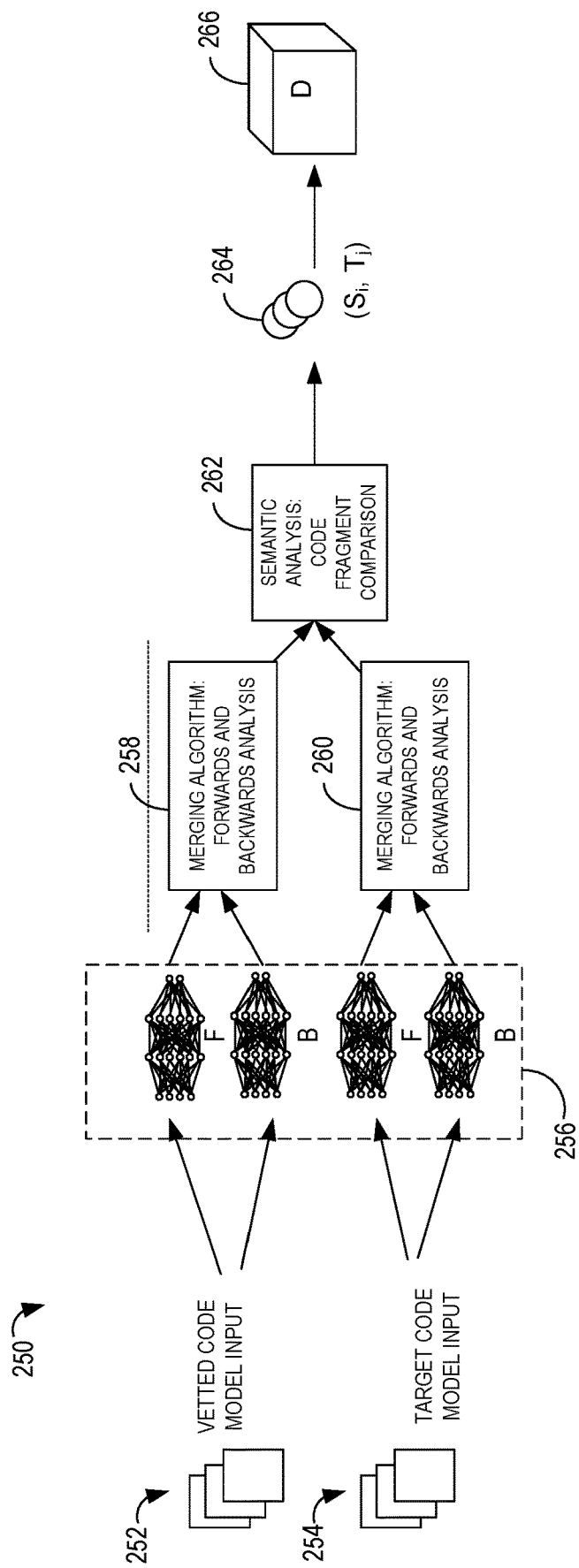
FIG. 2B is a schematic illustration of an example bidirectional analysis framework.

While an example manner of implementing the example code semantics analysis system 100, including the example code semantic analyzer circuitry 108 of FIGS. 1, 2A and 2B is illustrated in FIGS. 1, 2A and 2B, one or more of the elements, processes, and/or devices illustrated in FIGS. 1, 2A and 2B may be combined, divided, re-arranged, omitted, eliminated, and/or implemented in any other way. Further, the example I/O circuitry 202, the example bidirectional model circuitry 204, the example validated repository parse circuitry 206, the example syntax analysis circuitry 208, the example divisional segmentation circuitry 210, the example target repository mining circuitry 212, the example bidirectional analysis circuitry 214, the example merge circuitry 216, the example code fragment compare circuitry 218, the example defect analysis circuitry 220, and/or, more generally, the example example code semantic analyzer circuitry 108 of FIGS. 1, 2A and 2B, may be implemented by hardware alone or by hardware in combination with software and/or firmware. Thus, for example, any of the example I/O circuitry 202, the example bidirectional model circuitry 204, the example validated repository parse circuitry 206, the example syntax analysis circuitry 208, the example divisional segmentation circuitry 210, the example target repository mining circuitry 212, the example bidirectional analysis circuitry 214, the example merge circuitry 216, the example code fragment compare circuitry 218, the example defect analysis circuitry 220, and/or, more generally, the example example code semantic analyzer circuitry 108 of FIGS. 1, 2A and 2B, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example code semantic analyzer circuitry 108 of FIGS. 1, 2A and 2B may include one or more elements, processes, and/or devices in addition to, or instead of, those illustrated in FIGS. 1, 2A and 2B and/or may include more than one of any or all of the illustrated elements, processes and devices.

Flowcharts representative of example hardware logic circuitry, machine readable instructions, hardware implemented state machines, and/or any combination thereof for implementing the example code semantic analyzer circuitry 108 of FIGS. 1, 2A and 2B are shown in FIGS. 3-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The programs may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3-6, many other methods of implementing the example code semantic analyzer circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Per, Python, JavaScript, HyperText Markup Language (HTML), Structured Query Language (SQL), Swift, etc.

As mentioned above, the example operations of FIGS. 3-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"). "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
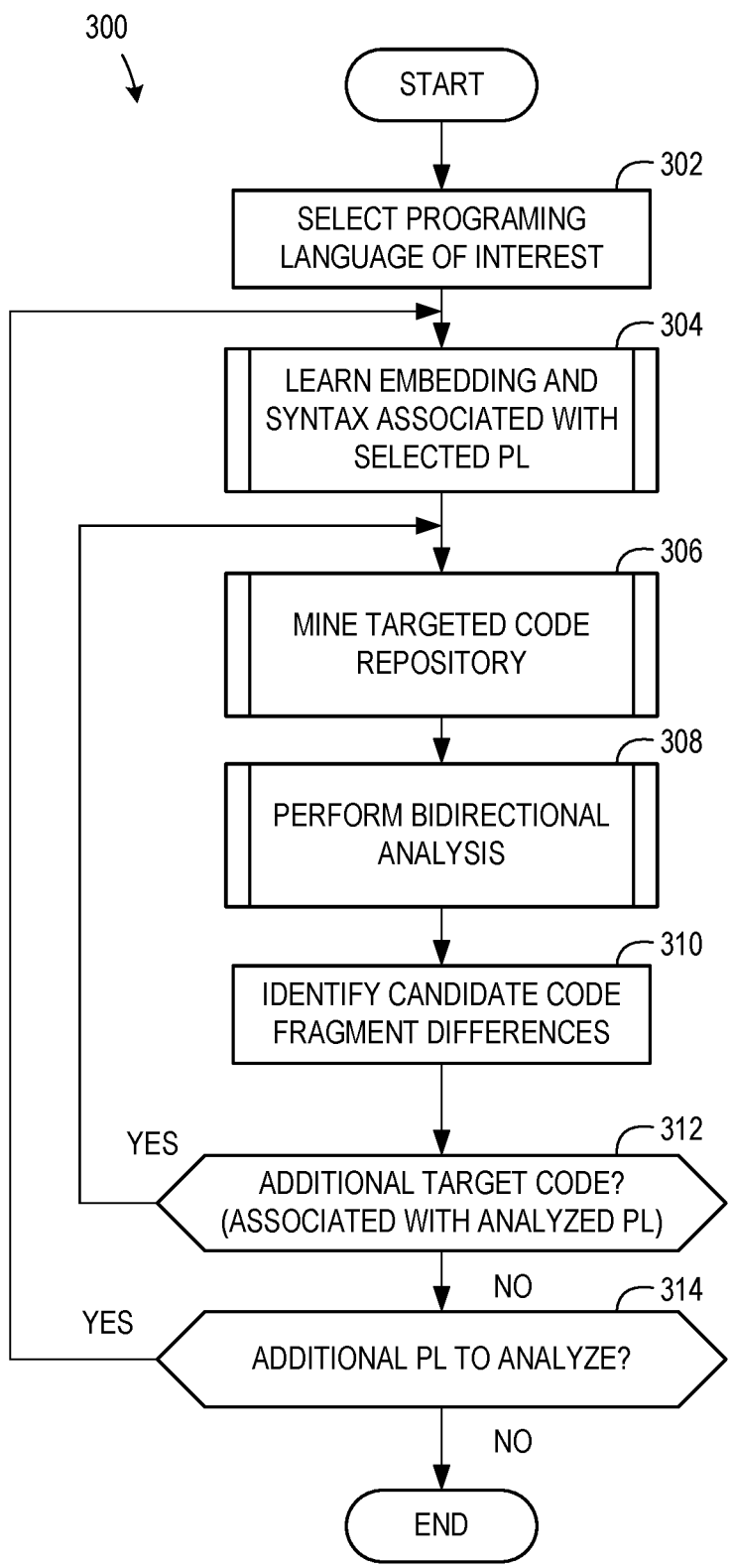
FIGS. 3-6 are flowcharts representative of example machine readable instructions and/or example operations that may be executed by example processor circuitry to implement the system to identify and analyze code semantics of FIG. 1, and to implement the example code semantic analyzer circuitry of FIG. 2A and the example bidirectional analysis framework of FIG. 2B.

FIG. 3 is a flowchart representative of example machine readable instructions and/or example operations 300 that may be executed and/or instantiated by processor circuitry to analyze code fragment semantics. The machine readable instructions and/or the operations 300 of FIG. 3 begin at block 302, at which the example I/O circuitry 202 selects a programming language (PL) of interest to be analyzed. In some examples, the PL of interest is, instead, derived after one or more code fragments is selected for analysis, in which the PL of interest is determined based on analysis of those fragments. The example bidirectional model circuitry 204 learns embeddings and syntax associated with the selected PL (block 304) as discussed above and in further detail below. In particular, such learned embeddings and syntax facilitate the formation of two separate bidirectional models that are trained in view of validated code from one or more validated code repositories.

The example target repository mining circuitry 212 mines and/or otherwise parses particular target code in an effort to learn its semantics (block 306), as described above and in further detail below. The example bidirectional analysis circuitry 214 performs a bidirectional analysis using both known good code (e.g., vetted code from the example validated code repository 104) and target code of interest (e.g., code from the example target code repository 105) (block 308), as described above and in further detail below. Based on the bidirectional analysis (e.g., inference with the forward and backward models), the example defect analysis circuitry 220 identifies candidate code fragment differences (block 310), which may be indicative of code defects worthy of further scrutiny and/or analysis. In the event the example I/O circuitry 202 determines that there are one or more additional target code fragments that are associated with the same PL as the previously analyzed code fragments (block 312), then control returns to block 306. Otherwise the example I/O circuitry 202 determines whether there are one or more additional PL of interest to be analyzed (block 314), in which case control returns to block 304.

Figure 4:
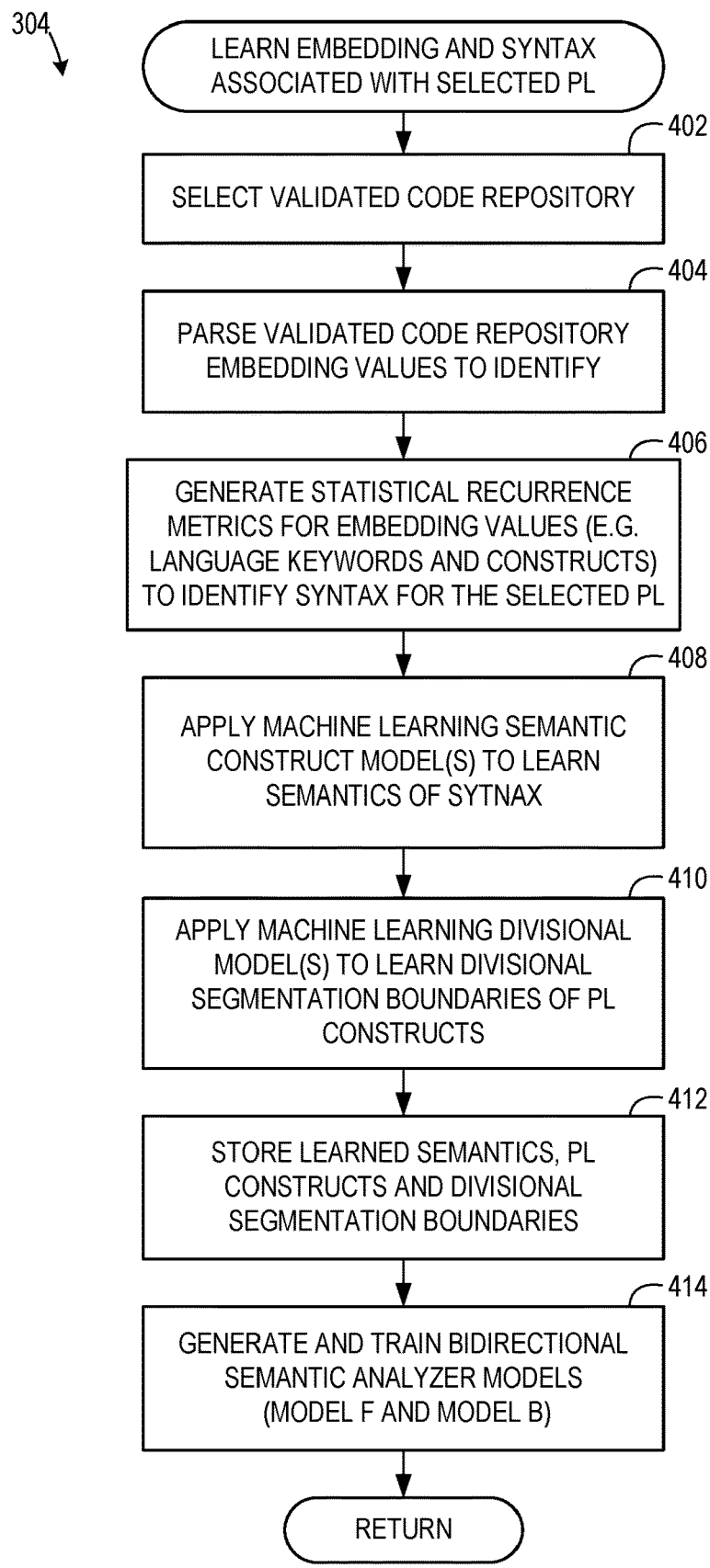

FIG. 4 illustrates additional detail corresponding to learning embeddings and syntax associated with a PL of interest (block 304) of FIG. 3. In the illustrated example of FIG. 4, the example I/O circuitry 202 selects code fragments from the example vetted code repository (block 402). As described above, vetted code is considered defect-free code, such as IBM's CodeNet and/or Google's Code Jam, but examples disclosed herein are not limited thereto. The example validated repository parse circuitry 206 parses the validated code repository and/or selected code fragments therein to identify embedding values (block 404). As described above, embedding values are particular programming language instructions and/or symbols, such as "for," "if" and "switch" statements. However, prior to any ML/AI analysis, such symbols do not include meaningful construct information that would indicate a particular PL construct that causes a particular programmatic result in the PL of interest. The example syntax analysis circuitry 208 generates statistical recurrence metrics for the parsed embedding values to identify syntax patterns (syntax information, syntactic information) for the PL of interest (block 406), and then applies machine learning semantic construct model(s) to learn the semantics of the syntax patterns (block 408). For instance, examples disclosed herein will learn that an embedding value of "switch" in combination with one or more "case" symbols and "default" symbols are indicative of decision logic semantics.

The example divisional segmentation circuitry 210 applies machine learning divisional model(s) to learn various divisional segmentation boundaries of the PL constructs (block 410). The example bidirectional model circuitry 204 stores learned semantics, PL constructs and divisional segmentation boundaries in a memory for later use as vetted code model input (block 412). In particular, this vetted code model input data is used by the example bidirectional model circuitry 204 to generate and train bidirectional semantic analyzer models, including a forward semantic model (F) and a backward semantic model (B) (block 414).

Figure 5:
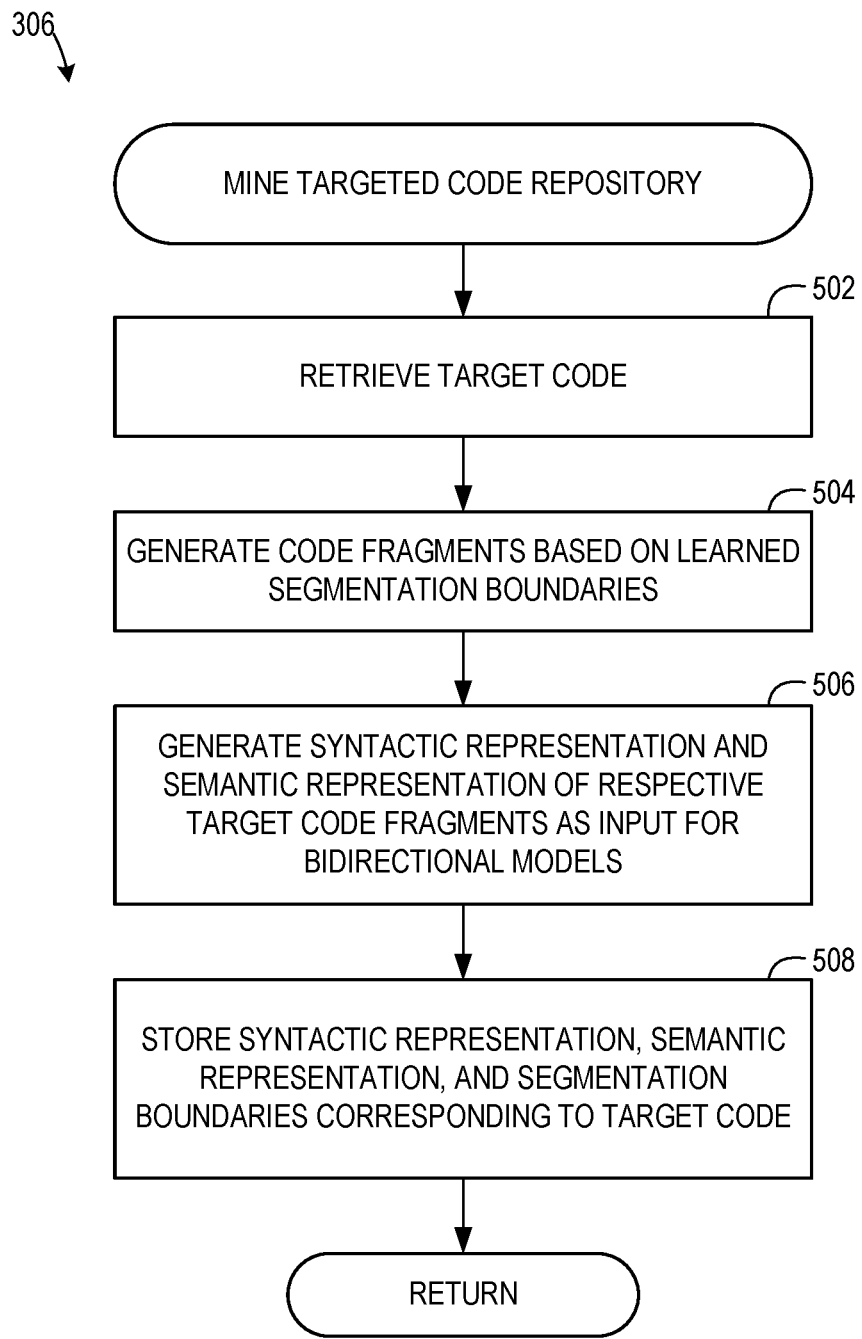

FIG. 5 includes additional detail corresponding to mining the target code repository (block 306) of FIG. 3. In the illustrated example of FIG. 5, the example I/O circuitry 202 retrieves target code of interest (block 502). As described above, the target code of interest may be any number of code fragments that have not received sufficient debug efforts and/or may be deemed suspect. The example target repository mining circuitry 212 generates code fragments based on the previously learned segmentation boundaries (block 504) so that further analysis occurs in a manner that is consistent with code fragments of vetted code. The example target repository mining circuitry 212 generates syntactic representations and semantic representations of the target code fragments to be used as input for bidirectional model analysis (block 506). In some examples, these representations include simplified parse trees, context-aware semantic structures and/or program-derived semantics graphs. The example target repository mining circuitry 212 stores the syntactic representations, semantic representations and segmentation boundary information corresponding to the target code as target code model input (block 508). Control then returns to block 308 of FIG. 3.

Figure 6:
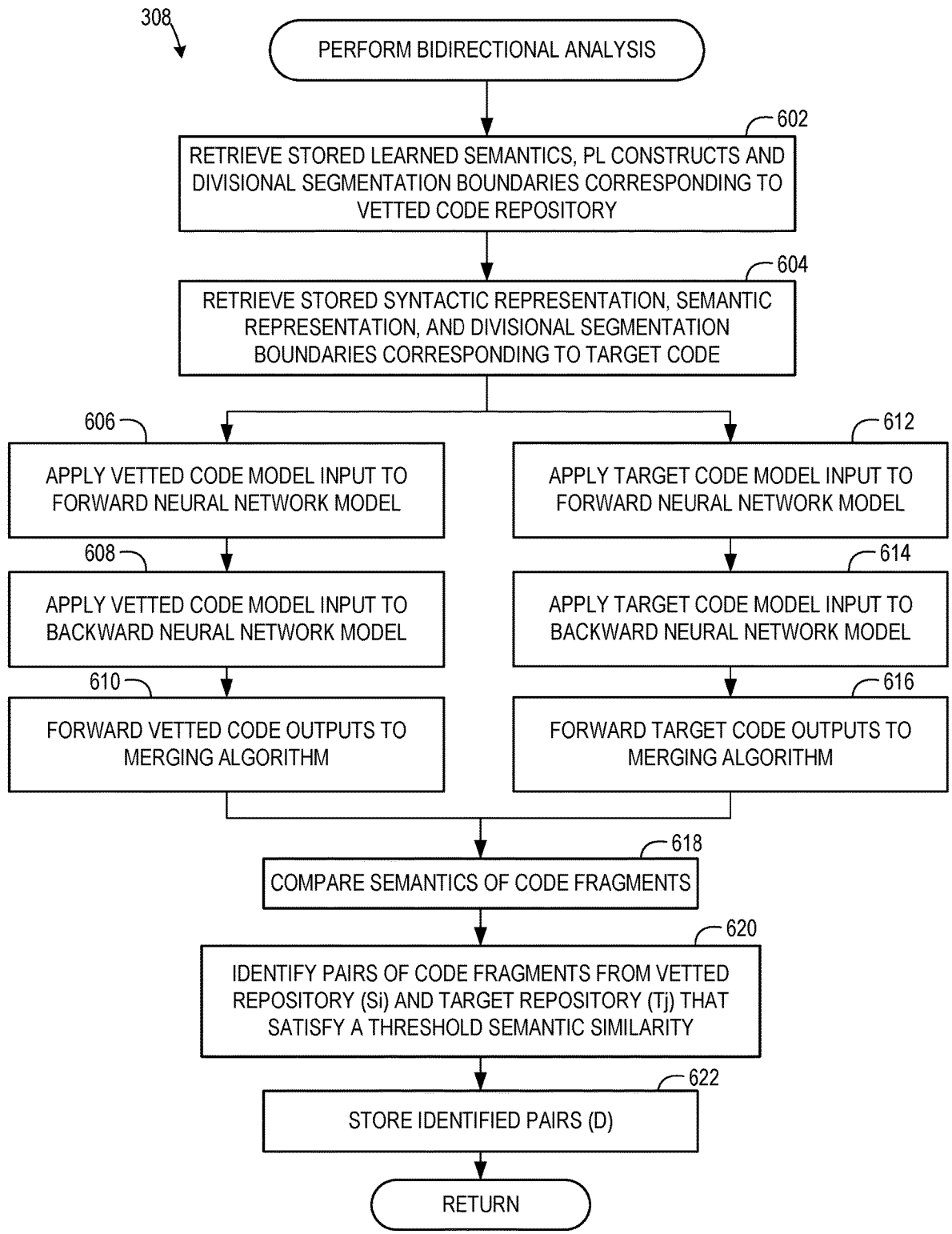

FIG. 6 includes additional detail corresponding to performing bidirectional analysis on both vetted code and target code of interest (block 308) of FIG. 3. In the illustrated example of FIG. 6, the example bidirectional model circuitry 204 retrieves the stored learned semantics, PL constructs and divisional segmentation boundaries corresponding to fragments from the vetted code (block 602). Additionally, the example bidirectional model circuitry 204 retrieves the stored learned semantics, PL constructs and divisional segmentation boundaries corresponding to fragments from the target code (block 604). As described above in view of FIG. 2B, this is shown as an example framework 250 in which the vetted code and target code inputs are processed in parallel with respective pairs of forward models (F) and backward models (B).

Starting with the example vetted code, the example bidirectional analysis circuitry 214 applies the vetted code model input to the trained forward neural network model (block 606) and to the trained backward neural network model (block 608). The example merge circuitry 216 forwards the vetted code model output data (backward semantic output data) to one or more merging algorithms (block 610). Similar to the example vetted code described above, the example bidirectional analysis circuitry 214 applies the target code model input to the trained forward neural network model (block 612) and to the trained backward neural network model (block 614). The example merge circuitry 216 forwards the trained code model output data (forward semantic output data) to one or more merging algorithms (block 616). The example code fragment compare circuitry 218 compares the semantics of the code fragments (block 618), and identifies pairs of code fragments from the vetted repository (Si) and the target repository (Tj) that satisfy a threshold semantic similarity (block 620). Identified pairs that satisfy threshold conditions are stored by the code fragment compare circuitry 218 to be flagged as possibly defective (block 622).

Figure 7:
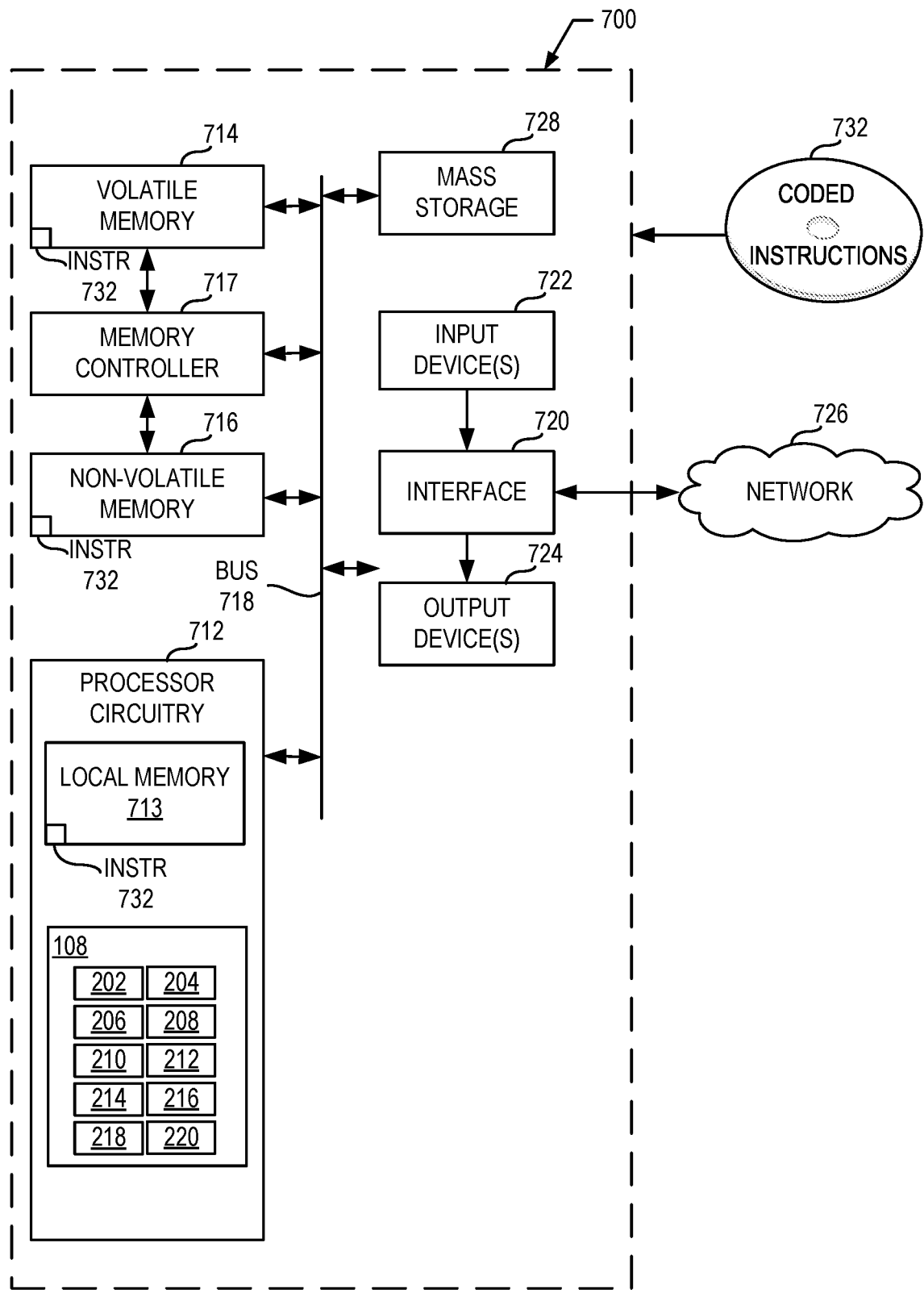
FIG. 7 is a block diagram of an example processing platform including processor circuitry structured to execute the example machine readable instructions and/or the example operations of FIGS. 3-6 to implement the example system to identify and analyze code semantics of FIG. 1, the example code semantic analyzer circuitry of FIG. 2A, and the example bidirectional analysis framework of FIG. 2B.

FIG. 7 is a block diagram of an example processor platform 700 structured to execute and/or instantiate the machine readable instructions and/or the operations of FIGS. 3-6 to implement the code semantic analyzer circuitry 108 of FIGS. 1, 2A and 2B. The processor platform 700 can be, for example, a server, a personal computer, a workstation, a self-learning machine (e.g., a neural network), a mobile device (e.g., a cell phone, a smart phone, a tablet such as an iPad™), a gaming console, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs. DSPs. and/or microcontrollers from any desired family or manufacturer. The processor circuitry 712 may be implemented by one or more semiconductor based (e.g., silicon based) devices. In this example, the processor circuitry 712 implements the example I/O circuitry 202, the example bidirectional model circuitry 204, the example validated repository parse circuitry 206, the example syntax analysis circuitry 208, the example divisional segmentation circuitry 210, the example target repository mining circuitry 212, the example bidirectional analysis circuitry 214, the example merge circuitry 216, the example code fragment compare circuitry 218, the example defect analysis circuitry 220, and/or, more generally, the example example code semantic analyzer circuitry 108.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 732, which may be implemented by the machine readable instructions of FIGS. 3-6, may be stored in the mass storage device 728, in the volatile memory 714, in the non-volatile memory 716, and/or on a removable non-transitory computer readable storage medium such as a CD or DVD.

Figure 8:
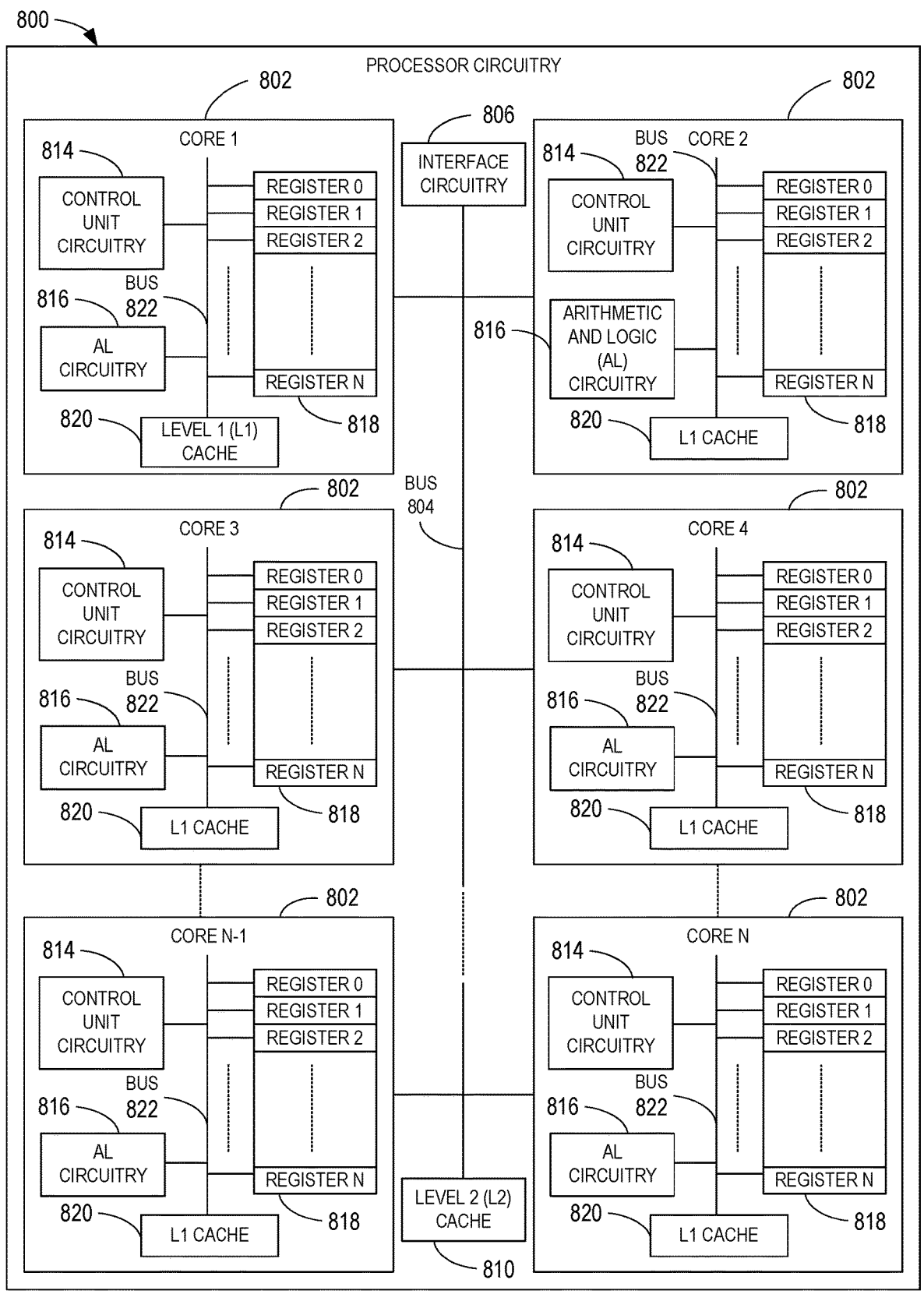
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a general purpose microprocessor 800. The general purpose microprocessor circuitry 800 executes some or all of the machine readable instructions of the flowcharts of FIGS. 3-6 to effectively instantiate the circuitry of FIGS. 1, 2A and 2B as logic circuits to perform the operations corresponding to those machine readable instructions. In some such examples, the circuitry of FIGS. 1, 2A and 2B is instantiated by the hardware circuits of the microprocessor 800 in combination with the instructions. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 3-6.

The cores 802 may communicate by a first example bus 804. In some examples, the first bus 804 may implement a communication bus to effectuate communication associated with one(s) of the cores 802. For example, the first bus 804 may implement at least one of an Inter-Integrated Circuit (I2C) bus, a Serial Peripheral Interface (SPI) bus, a PCI bus, or a PCIe bus. Additionally or alternatively, the first bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L 1 cache 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
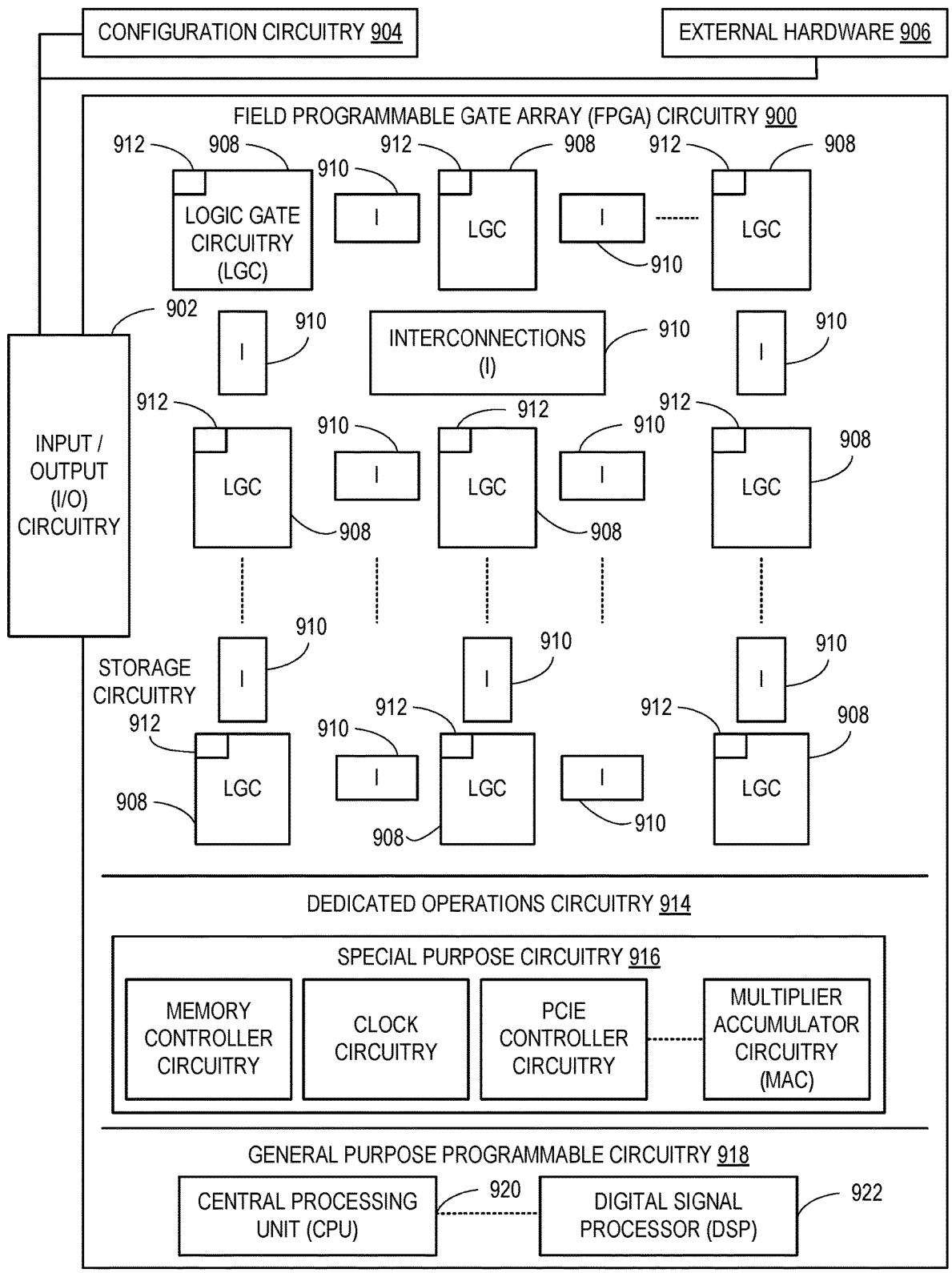
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 3-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 3-6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 3-6. As such, the FPGA circuitry 900 may be structured to effectively instantiate some or all of the machine readable instructions of the flowcharts of FIGS. 3-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 3-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 3-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modem FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 3-6 may be executed by one or more of the cores_02 of FIG. 5, a second portion of the machine readable instructions represented by the flowcharts of FIGS. 3-6 may be executed by the FPGA circuitry 900 of FIG. 9, and/or a third portion of the machine readable instructions represented by the flowcharts of FIGS. 3-6 may be executed by an ASIC. It should be understood that some or all of the circuitry of FIGS. 1,2A and 2B may, thus, be instantiated at the same or different times. Some or all of the circuitry may be instantiated, for example, in one or more threads executing concurrently and/or in series. Moreover, in some examples, some or all of the circuitry of FIGS. 1, 2A and 2B may be implemented within one or more virtual machines and/or containers executing on the microprocessor.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
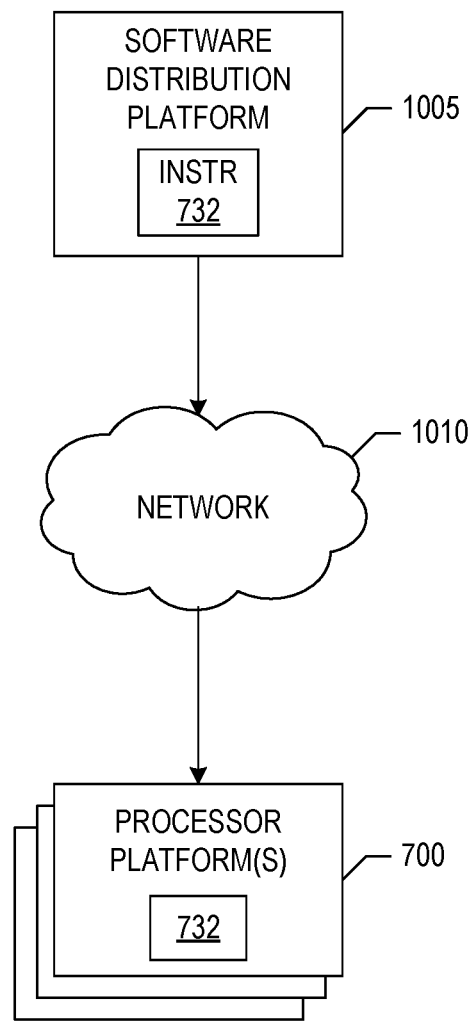
FIG. 10 is a block diagram of an example software distribution platform (e.g., one or more servers) to distribute software (e.g., software corresponding to the example machine readable instructions of FIGS. 3-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions of FIGS. 3-6, as described above. The one or more servers of the example software distribution platform 1005 are in communication with a network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions of FIGS. 3-6, may be downloaded to the example processor platform 400, which is to execute the machine readable instructions 732 to implement the code semantic analyzer circuitry 108. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that improve semantic discovery of code fragments. Examples disclosed herein improve such analysis by leveraging semantic analysis techniques to derive some semantic information as a baseline, in combination with syntax statistical occurrence data and in consideration of divisional segmentation boundaries associated with code syntax and/or programming language constructs present within code fragments. Additionally, rather than merely apply learning algorithms to code fragments in a forward temporal manner, examples disclosed herein analyze code fragments in a bidirectional manner to improve the quality and thoroughness of semantic information acquisition.

Example methods, apparatus, systems and articles of manufacture to identify code semantics are disclosed herein. Further examples and combinations thereof include the following:

Example 1 includes an apparatus to identify code semantics, the apparatus comprising interface circuitry to access a first request to execute a service, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate validated repository parse circuitry to identify embedding values corresponding to validated code, syntax analysis circuitry to identify syntax information based on statistical recurrence metrics of the embedding values, bidirectional model circuitry to train a forward semantic model and a backward semantic model based on (a) semantic information corresponding to the syntax information and (b) divisional segmentation information corresponding to the syntax information, and target repository mining circuitry to generate target code model input fragments including learned syntactic information, learned semantic information, and learned divisional segmentation information, wherein the target code model input fragments are to facilitate inference with the forward semantic model and the backward semantic model.

Example 2 includes the apparatus as defined in example 1, wherein the processor circuitry is to instantiate bidirectional analysis circuitry to apply the target code model input fragments to the forward semantic model and the backward semantic model, the forward and backward semantic models to generate respective forward target semantic output and backward target semantic output, and apply vetted code model input fragments to the forward semantic model and the backward semantic model, the forward and backward semantic models to generate respective forward vetted semantic output and backward vetted semantic output.

Example 3 includes the apparatus as defined in example 2, wherein the processor circuitry is to instantiate merge circuitry to merge (a) forward target semantic output data and backward target semantic output data and (b) forward vetted semantic output data and backward vetted semantic output data.

Example 4 includes the apparatus as defined in example 3, wherein the processor circuitry is to instantiate code fragment compare circuitry to compare semantic data between (a) the merged forward and backward target semantic output data and (b) the merged forward and backward vetted semantic output data, and identify code fragments that satisfy threshold semantic difference values.

Example 5 includes the apparatus as defined in example 4, wherein the processor circuitry is to instantiate defect analysis circuitry to flag respective ones of the identified code fragments indicative of erroneous semantics.

Example 6 includes the apparatus as defined in example 1, wherein the embedding values include at least one of programming language tokens or programming language operands.

Example 7 includes the apparatus as defined in example 6, wherein the programming language tokens include at least one of for statements, if statements or switch statements.

Example 8 includes the apparatus as defined in example 1, wherein the bidirectional model circuitry is to train the forward semantic model with a temporally increasing sequence of code fragments, and train the backward semantic model with a temporally decreasing sequence of code fragments.

Example 9 includes At least one non-transitory computer readable medium comprising instructions that, when executed, cause processor circuitry to at least identify embedding values corresponding to validated code, identify syntax information based on statistical recurrence metrics of the embedding values, train a forward semantic model and a backward semantic model based on (a) semantic information corresponding to the syntax information and (b) divisional segmentation information corresponding to the syntax information, and generate target code model input fragments including learned syntactic information, learned semantic information, and learned divisional segmentation information, wherein the target code model input fragments are to facilitate inference with the forward semantic model and the backward semantic model.

Example 10 includes the at least one non-transitory computer readable medium as defined in example 9, wherein the instructions, when executed, cause the processor circuitry to apply the target code model input fragments to the forward semantic model and the backward semantic model, the forward and backward semantic models to generate respective forward target semantic output and backward target semantic output, and apply vetted code model input fragments to the forward semantic model and the backward semantic model, the forward and backward semantic models to generate respective forward vetted semantic output and backward vetted semantic output.

Example 11 includes the at least one non-transitory computer readable medium as defined in example 10, wherein the instructions, when executed, cause the processor circuitry to merge forward target semantic output data and backward target semantic output data, and forward vetted semantic output data and backward semantic output data.

Example 12 includes the at least one non-transitory computer readable medium as defined in example 11, wherein the instructions, when executed, cause the processor circuitry to compare semantic data between (a) the merged forward and backward target semantic output data and (b) the merged forward and backward vetted semantic output data, and identify code fragments that satisfy threshold semantic difference values.

Example 13 includes the at least one non-transitory computer readable medium as defined in example 12, wherein the instructions, when executed, cause the processor circuitry to instantiate defect analysis circuitry to flag respective ones of the identified code fragments indicative of erroneous semantics.

Example 14 includes the at least one non-transitory computer readable medium as defined in example 9, wherein instructions, when executed, cause the processor circuitry to identify the embedding values as at least one of programming language tokens or programming language operands.

Example 15 includes the at least one non-transitory computer readable medium as defined in example 14, wherein the instructions, when executed, cause the processor circuitry to identify the programming language tokens as at least one of for statements, if statements or switch statements.

Example 16 includes the at least one non-transitory computer readable medium as defined in example 9, wherein the instructions, when executed, cause the processor circuitry to train the forward semantic model with a temporally increasing sequence of code fragments, and train the backward semantic model with a temporally decreasing sequence of code fragments.

Example 17 includes an apparatus to identify code semantics, the apparatus comprising means for validated repository parsing to identify embedding values corresponding to validated code, means for syntax analysis to identify syntax information based on statistical recurrence metrics of the embedding values, means for bidirectional modeling to train a forward semantic model and a backward semantic model based on (a) semantic information corresponding to the syntax information and (b) divisional segmentation information corresponding to the syntax information, and means for target repository mining to generate target code model input fragments including learned syntactic information, learned semantic information, and learned divisional segmentation information, wherein the target code model input fragments are to facilitate inference with the forward semantic model and the backward semantic model.

Example 18 includes the apparatus as defined in example 17, wherein the means for bidirectional modeling is to apply the target code model input fragments to the forward semantic model and the backward semantic model, the forward and backward semantic models to generate respective forward target semantic output and backward target semantic output, and apply vetted code model input fragments to the forward semantic model and the backward semantic model, the forward and backward semantic models to generate respective forward vetted semantic output and backward vetted semantic output.

Example 19 includes the apparatus as defined in example 18, further including means for merging to merge (a) forward target semantic output data and backward target semantic output data and (b) forward vetted semantic output data and backward semantic output data.

Example 20 includes the apparatus as defined in example 19, further including means for comparing code to compare semantic data between (a) the merged forward and backward target semantic output data and (b) the merged forward and backward vetted semantic output data, and identify code fragments that satisfy threshold semantic difference values.

Example 21 includes the apparatus as defined in example 20, further including means for analyzing defects to flag respective ones of the identified code fragments indicative of erroneous semantics.

Example 22 includes the apparatus as defined in example 17, wherein the embedding values include at least one of programming language tokens or programming language operands.

Example 23 includes the apparatus as defined in example 22, wherein the programming language tokens include at least one of for statements, if statements or switch statements.

Example 24 includes the apparatus as defined in example 17, wherein the means for bidirectional modeling is to train the forward semantic model with a temporally increasing sequence of code fragments, and train the backward semantic model with a temporally decreasing sequence of code fragments.

Example 25 includes a method comprising identifying, by executing an instruction with processor circuitry, embedding values corresponding to validated code, identifying, by executing an instruction with the processor circuitry, syntax information based on statistical recurrence metrics of the embedding values, training, by executing an instruction with the processor circuitry, a forward semantic model and a backward semantic model based on (a) semantic information corresponding to the syntax information and (b) divisional segmentation information corresponding to the syntax information, and generating, by executing an instructions with the processor circuitry, target code model input fragments including learned syntactic information, learned semantic information, and learned divisional segmentation information, wherein the target code model input fragments are to facilitate inference with the forward semantic model and the backward semantic model.

Example 26 includes the method as defined in example 25, further including applying the target code model input fragments to the forward semantic model and the backward semantic model, the forward and backward semantic models to generate respective forward target semantic output and backward target semantic output, and applying vetted code model input fragments to the forward semantic model and the backward semantic model, the forward and backward semantic models to generate respective forward vetted semantic output and backward vetted semantic output.

Example 27 includes the method as defined in example 26, further including merging forward target semantic output data and backward target semantic output data, and forward vetted semantic output data and backward semantic output data.

Example 28 includes the method as defined in example 27, further including comparing semantic data between (a) the merged forward and backward target semantic output data and (b) the merged forward and backward vetted semantic output data, and identifying code fragments that satisfy threshold semantic difference values.

Example 29 includes the method as defined in example 28, further including instantiating defect analysis circuitry to flag respective ones of the identified code fragments indicative of erroneous semantics.

Example 30 includes the method as defined in example 25, further including identifying the embedding values as at least one of programming language tokens or programming language operands.

Example 31 includes the method as defined in example 30, further including identifying the programming language tokens as at least one of for statements, if statements or switch statements.

Example 32 includes the method as defined in example 25, further including training the forward semantic model with a temporally increasing sequence of code fragments, and training the backward semantic model with a temporally decreasing sequence of code fragments.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to identify code semantics, the apparatus comprising:
   interface circuitry to access a first request to execute a service; and
   processor circuitry including one or more of:
   at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
   a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry (ASIC) including logic gate circuitry to perform one or more third operations;

the processor circuitry to perform at least one of the first operations, the second operations, or the third operations to instantiate:

validated repository parse circuitry to identify embedding values corresponding to validated code;

syntax analysis circuitry to identify syntax information based on statistical recurrence metrics of the embedding values;

bidirectional model circuitry to train a forward semantic model and a backward semantic model based on (a) semantic information corresponding to the syntax information and (b) divisional segmentation information corresponding to the syntax information; and target repository mining circuitry to generate target code model input fragments including learned syntactic information, learned semantic information, and learned divisional segmentation information, wherein the target code model input fragments are to facilitate inference with the forward semantic model and the backward semantic model.

2. The apparatus as defined in claim 1, wherein the processor circuitry is to instantiate bidirectional analysis circuitry to:

apply the target code model input fragments to the forward semantic model and the backward semantic model, the forward and backward semantic models to generate respective forward target semantic output and backward target semantic output; and apply vetted code model input fragments to the forward semantic model and the backward semantic model, the forward and backward semantic models to generate respective forward vetted semantic output and backward vetted semantic output.

3. The apparatus as defined in claim 2, wherein the processor circuitry is to instantiate merge circuitry to merge (a) forward target semantic output data and backward target semantic output data and (b) forward vetted semantic output data and backward semantic output data.

4. The apparatus as defined in claim 3, wherein the processor circuitry is to instantiate code fragment compare circuitry to:

compare semantic data between (a) the merged forward and backward target semantic output data and (b) the merged forward and backward vetted semantic output data; and identify code fragments that satisfy threshold semantic difference values.

5. The apparatus as defined in claim 4, wherein the processor circuitry is to instantiate defect analysis circuitry to flag respective ones of the identified code fragments indicative of erroneous semantics.

6. The apparatus as defined in claim 1, wherein the embedding values include at least one of programming language tokens or programming language operands.

7. The apparatus as defined in claim 6, wherein the programming language tokens include at least one of for statements, if statements or switch statements.

8. The apparatus as defined in claim 1, wherein the bidirectional model circuitry is to:

train the forward semantic model with a temporally increasing sequence of code fragments; and train the backward semantic model with a temporally decreasing sequence of code fragments.

9. At least one non-transitory computer readable medium comprising instructions that, when executed, cause processor circuitry to at least:

identify embedding values corresponding to validated code;

identify syntax information based on statistical recurrence metrics of the embedding values;

train a forward semantic model and a backward semantic model based on (a) semantic information corresponding to the syntax information and (b) divisional segmentation information corresponding to the syntax information; and generate target code model input fragments including learned syntactic information, learned semantic information, and learned divisional segmentation information, wherein the target code model input fragments are to facilitate inference with the forward semantic model and the backward semantic model.

10. The at least one non-transitory computer readable medium as defined in claim 9, wherein the instructions, when executed, cause the processor circuitry to:

apply the target code model input fragments to the forward semantic model and the backward semantic model, the forward and backward semantic models to generate respective forward target semantic output and backward target semantic output; and apply vetted code model input fragments to the forward semantic model and the backward semantic model, the forward and backward semantic models to generate respective forward vetted semantic output and backward vetted semantic output.

11. The at least one non-transitory computer readable medium as defined in claim 10, wherein the instructions, when executed, cause the processor circuitry to merge:

forward target semantic output data and backward target semantic output data; and forward vetted semantic output data and backward semantic output data.

12. The at least one non-transitory computer readable medium as defined in claim 11, wherein the instructions, when executed, cause the processor circuitry to:

compare semantic data between (a) the merged forward and backward target semantic output data and (b) the merged forward and backward vetted semantic output data; and identify code fragments that satisfy threshold semantic difference values.

13. The at least one non-transitory computer readable medium as defined in claim 12, wherein the instructions, when executed, cause the processor circuitry to instantiate defect analysis circuitry to flag respective ones of the identified code fragments indicative of erroneous semantics.

14. The at least one non-transitory computer readable medium as defined in claim 9, wherein the instructions, when executed, cause the processor circuitry to identify the embedding values as at least one of programming language tokens or programming language operands.

15. The at least one non-transitory computer readable medium as defined in claim 14, wherein the instructions, when executed, cause the processor circuitry to identify the programming language tokens as at least one of for statements, if statements or switch statements.

16. The at least one non-transitory computer readable medium as defined in claim 9, wherein the instructions, when executed, cause the processor circuitry to:
- train the forward semantic model with a temporally increasing sequence of code fragments; and
- train the backward semantic model with a temporally decreasing sequence of code fragments.

17. A method comprising:
- identifying, by executing an instruction with processor circuitry, embedding values corresponding to validated code;
- identifying, by executing an instruction with the processor circuitry, syntax information based on statistical recurrence metrics of the embedding values;
- training, by executing an instruction with the processor circuitry, a forward semantic model and a backward semantic model based on (a) semantic information corresponding to the syntax information and (b) divisional segmentation information corresponding to the syntax information; and
- generating, by executing an instructions with the processor circuitry, target code model input fragments including learned syntactic information, learned semantic information, and learned divisional segmentation information,
- wherein the target code model input fragments are to facilitate inference with the forward semantic model and the backward semantic model.

18. The method as defined in claim 17, further including:
- applying the target code model input fragments to the forward semantic model and the backward semantic model, the forward and backward semantic models to generate respective forward target semantic output and backward target semantic output; and
- applying vetted code model input fragments to the forward semantic model and the backward semantic model, the forward and backward semantic models to generate respective forward vetted semantic output and backward vetted semantic output.

19. The method as defined in claim 18, further including merging:
- forward target semantic output data and backward target semantic output data; and
- forward vetted semantic output data and backward semantic output data.

20. The method as defined in claim 19, further including:
- comparing semantic data between (a) the merged forward and backward target semantic output data and (b) the merged forward and backward vetted semantic output data; and
- identifying code fragments that satisfy threshold semantic difference values.

21. The method as defined in claim 20, further including instantiating defect analysis circuitry to flag respective ones of the identified code fragments indicative of erroneous semantics.

22. The method as defined in claim 17, further including identifying the embedding values as at least one of programming language tokens or programming language operands.

23. The method as defined in claim 22, further including identifying the programming language tokens as at least one of for statements, if statements or switch statements.

24. The method as defined in claim 17, further including:
- training the forward semantic model with a temporally increasing sequence of code fragments; and
- training the backward semantic model with a temporally decreasing sequence of code fragments.

* * * * *